United States Patent [19]
Roth et al.

[11] Patent Number: 5,909,526
[45] Date of Patent: Jun. 1, 1999

[54] FIBER OPTIC CONNECTOR ASSEMBLY

[75] Inventors: Richard F. Roth, Downers Grove; Ilya Makhlin, Wheeling; Gregory J. Spiewak, Coal City, all of Ill.

[73] Assignee: Molex Incorporated, Lisle, Ill.

[21] Appl. No.: 09/057,000

[22] Filed: Apr. 8, 1998

[51] Int. Cl.⁶ .................................................. G02B 6/36
[52] U.S. Cl. ............................... 385/78; 385/56; 385/77; 385/81
[58] Field of Search .................................. 385/55, 56, 58, 385/59, 60, 69, 72, 78, 81, 77, 75, 70

[56] References Cited

U.S. PATENT DOCUMENTS

| | | | |
|---|---|---|---|
| 4,186,997 | 2/1980 | Schumacher | 385/65 |
| 4,515,434 | 5/1985 | Margolin et al. | 385/65 |
| 4,725,120 | 2/1988 | Parzygnat | 385/59 |
| 4,736,100 | 4/1988 | Vastagh | 385/53 |
| 4,779,950 | 10/1988 | Williams | 385/58 |
| 4,795,231 | 1/1989 | Tanabe | 385/60 |
| 4,982,083 | 1/1991 | Graham et al. | 250/227.11 |
| 5,074,638 | 12/1991 | Poli et al. | 385/50 |
| 5,091,991 | 2/1992 | Briggs et al. | 385/82 |
| 5,125,056 | 6/1992 | Hughes et al. | 385/59 |
| 5,134,675 | 7/1992 | Poli et al. | 385/70 |
| 5,214,731 | 5/1993 | Chang et al. | 385/69 |
| 5,233,674 | 8/1993 | Vladic | 385/56 |
| 5,245,683 | 9/1993 | Belenkiy et al. | 385/72 |
| 5,265,181 | 11/1993 | Chang | 385/75 |
| 5,363,460 | 11/1994 | Marazzi et al. | 385/70 |
| 5,420,951 | 5/1995 | Marazzi et al. | 385/75 |
| 5,506,922 | 4/1996 | Grois et al. | 385/75 |
| 5,570,445 | 10/1996 | Chou et al. | 385/92 |
| 5,608,829 | 3/1997 | Oda et al. | 385/76 |
| 5,719,977 | 2/1998 | Lampert et al. | 385/60 |

*Primary Examiner*—Hemang Sanghavi
*Attorney, Agent, or Firm*—A. A. Tirva

[57] ABSTRACT

A fiber optic connector assembly is adapted for terminating at least one optical fiber of a fiber optic cable. The assembly includes a two-part elongated housing for receiving the fiber optic cable and defining a forward mating end and a rear end. The two parts of the housing extend along a substantial length of the housing through the rear end thereof. A ferrule is disposed within the forward end of the two-part housing for terminating the optical fiber. The two parts of the housing are juxtaposed and are adapted for receiving a crimp ring thereabout at the rear end of the housing. A pair of transversely spaced, complementarily engageable latches are operatively associated between the two housing parts. The pair of latches are disposed inside the outer profile of the housing and straddling opposite sides of the cable.

9 Claims, 11 Drawing Sheets

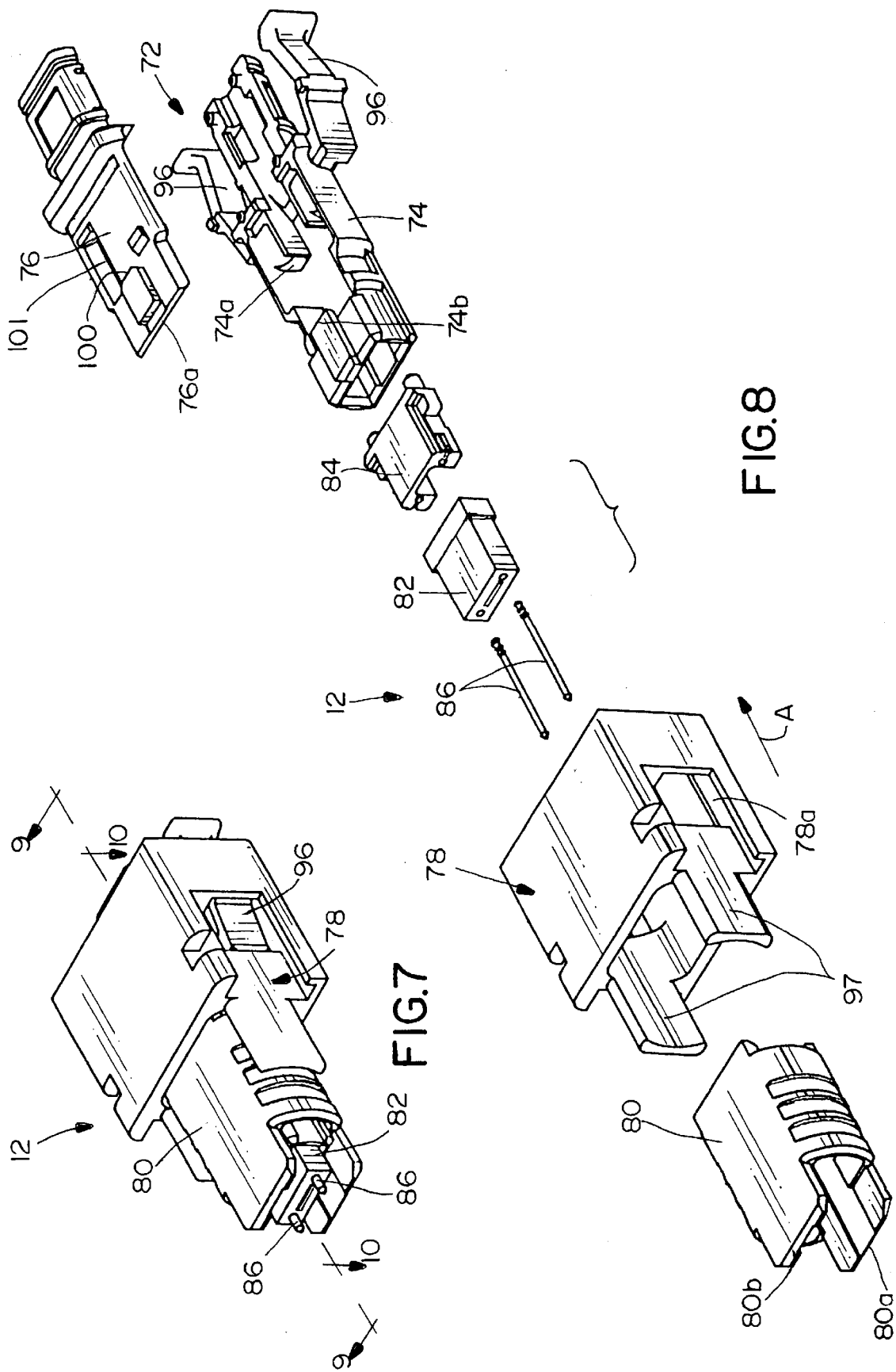

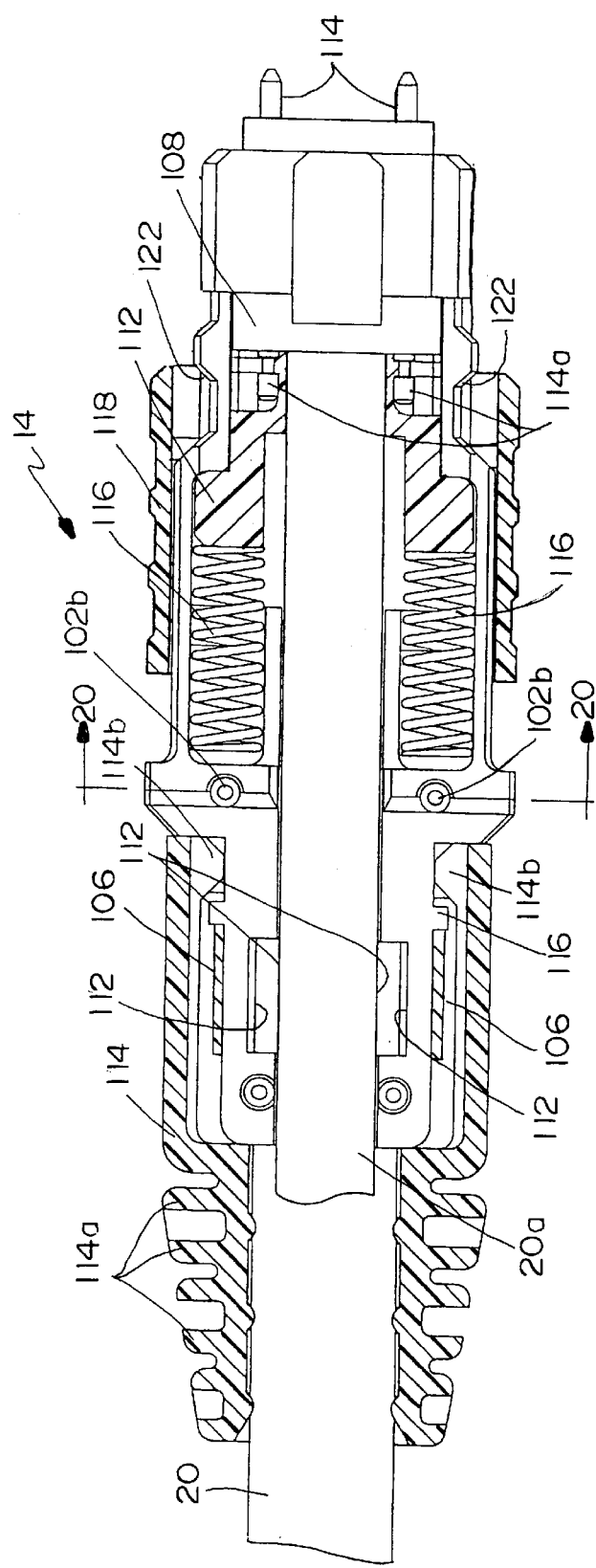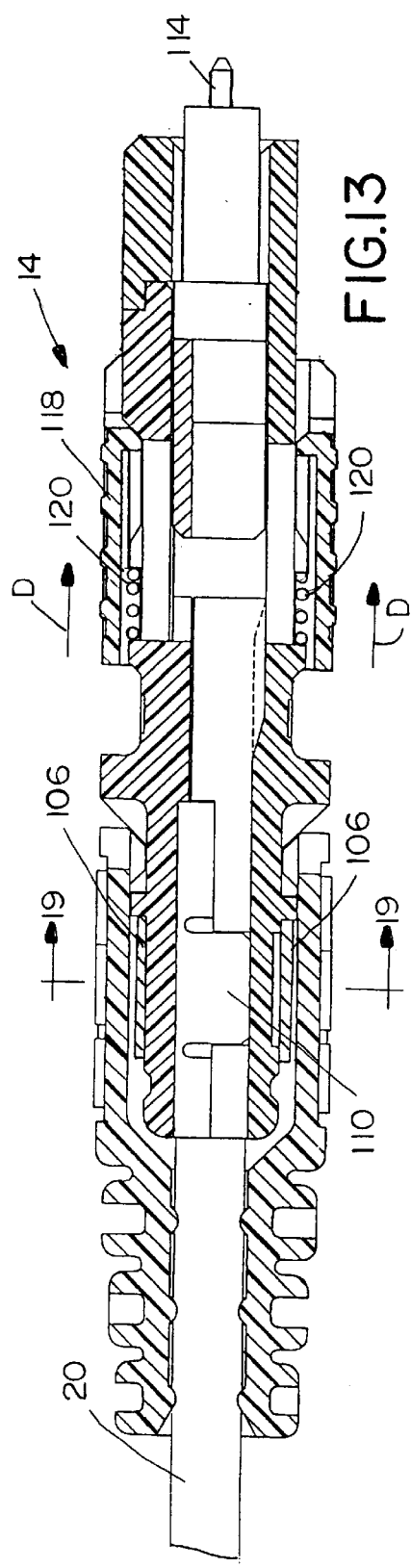

FIBER OPTIC CONNECTOR ASSEMBLY

FIELD OF THE INVENTION

This invention generally relates to the art of fiber optic transmission and, particularly, to a fiber optic connector assembly.

BACKGROUND OF THE INVENTION

Fiber optic connectors of a wide variety of designs have been employed to terminate optical fiber cables and to facilitate connection of the cables to other cables or other optical fiber transmission devices. A typical fiber optic connector includes a ferrule which mounts and centers an optical fiber or fibers within the connector. The ferrule may be fabricated of such material as ceramic. A ferrule holder or other housing component of the connector embraces the ferrule and may be fabricated of such material as molded plastic. A spring may be disposed within the housing or ferrule holder such that the ferrule is yieldably biased forwardly for engaging another fiber-mounting ferrule of a mating connecting device.

A pair of fiber optic connectors or a connector and another optical fiber transmission device often are mated in an adapter which centers the fibers to provide low insertion losses. The adapter couples the connectors together so that their encapsulated fibers connect end-to-end. The adapter may be an in-line component, or the adapter can be designed for mounting in an opening in a panel, backplane, circuit board or the like.

The present invention is directed to various improvements in such optical fiber apparatus.

SUMMARY OF THE INVENTION

An object, therefore, of the invention is to provide a new and improved fiber optic connector assembly for terminating at least one optical fiber of a fiber optic cable.

In the exemplary embodiment of the invention, the connector assembly includes a two-part elongated housing for receiving the fiber optic cable. The elongated housing defines a forward mating end and a rear end. The two parts of the housing extend along a substantial length of the housing through the rear end thereof. A ferrule is positioned within the forward end of the two-part housing for terminating the optical fiber. The two parts of the housing are juxtaposed and are adapted for receiving a crimp ring thereabout at the rear end of the housing. A pair of transversely spaced, complementarily engageable latch means are operatively associated between the two housing parts. The pair of latch means are disposed inside the outer profile of the housing and straddle opposite sides of the cable therewithin.

As disclosed herein, the latch means comprise a pair of latch arms disposed immediately on opposite sides of the cable when the cable is assembled in the housing. The latch arms project from one housing part and include latch hooks for snap-latch engagement with latch bosses on the other housing part. At least one of the housing parts includes at least one alignment post for insertion into an alignment hole in the other housing part in a direction generally transversely of the cable.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 7 is a perspective view of the board connector insertable into one end of the adapter assembly;

FIG. 8 is an exploded perspective view of the board connector;

FIG. 13 is a vertical section taken generally along line 13—13 of FIG. 11;

FIG. 14 is a horizontal section taken generally along line 14—14 of FIG. 12;

DETAILED DESCRIPTION OF THE PREFERRED EMBODIMENT

Figure 1:
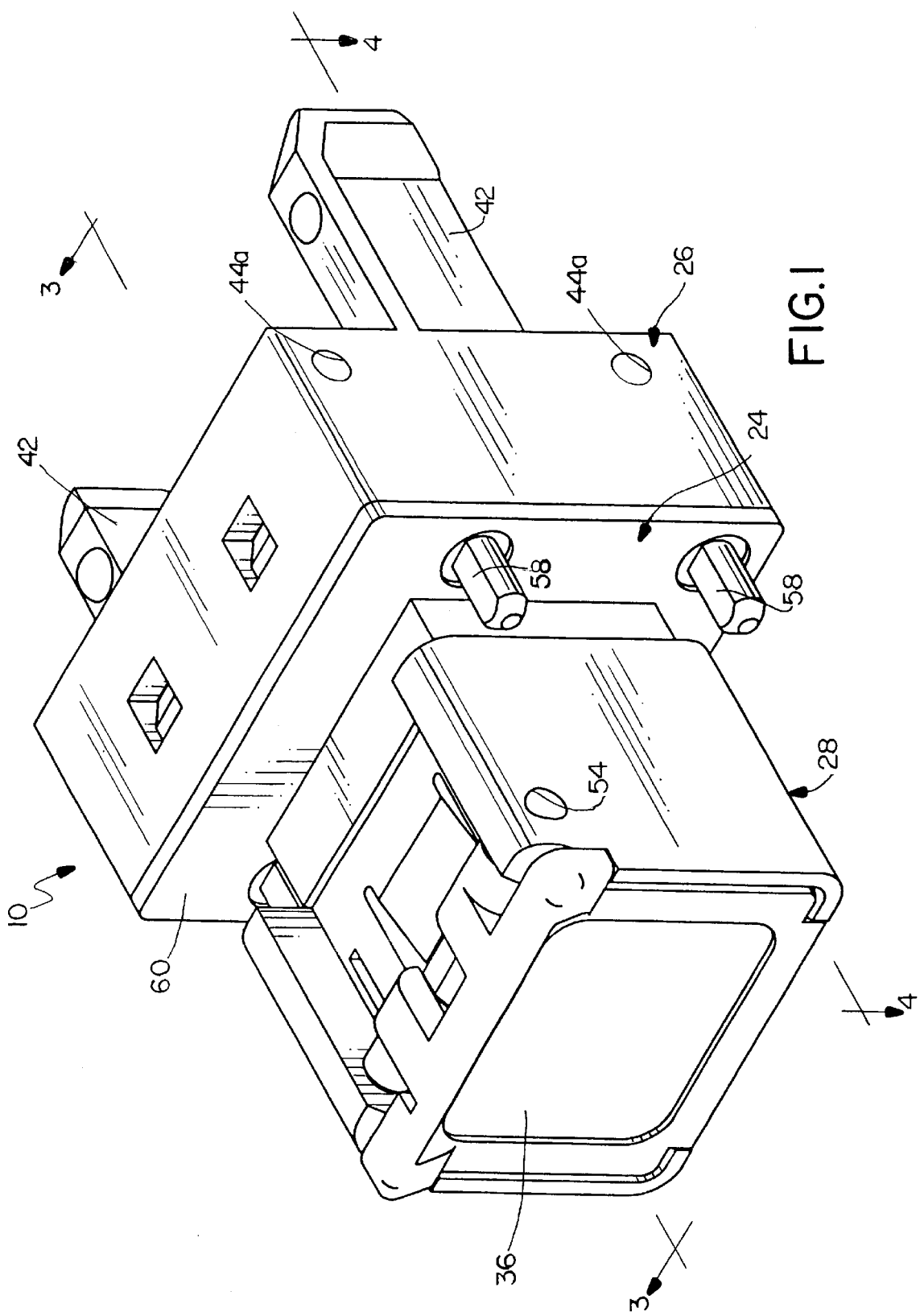
FIG. 1 is a perspective view of the adapter assembly.
Figure 2:
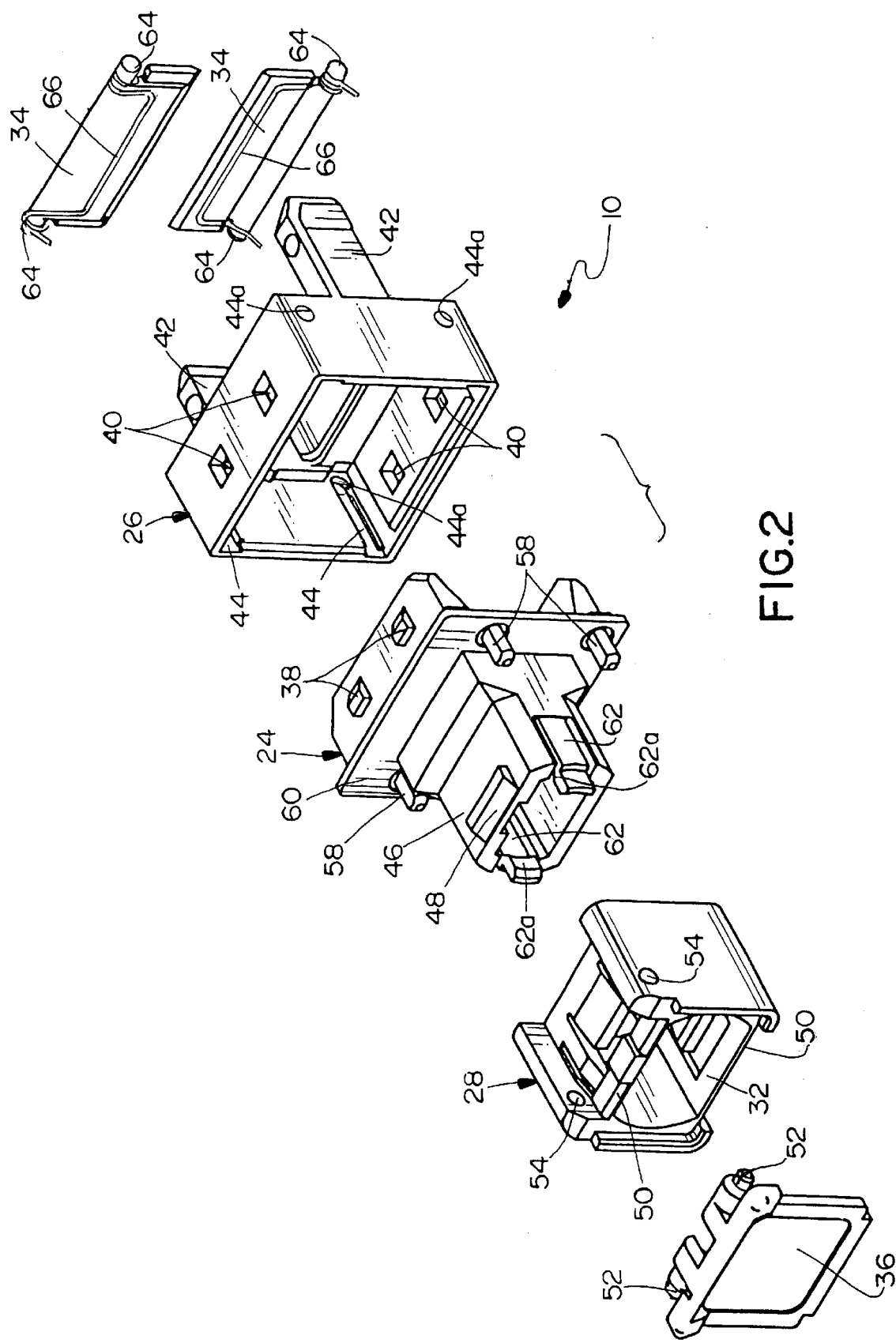
FIG. 2 is an exploded perspective view of the adapter assembly.
Figure 3:
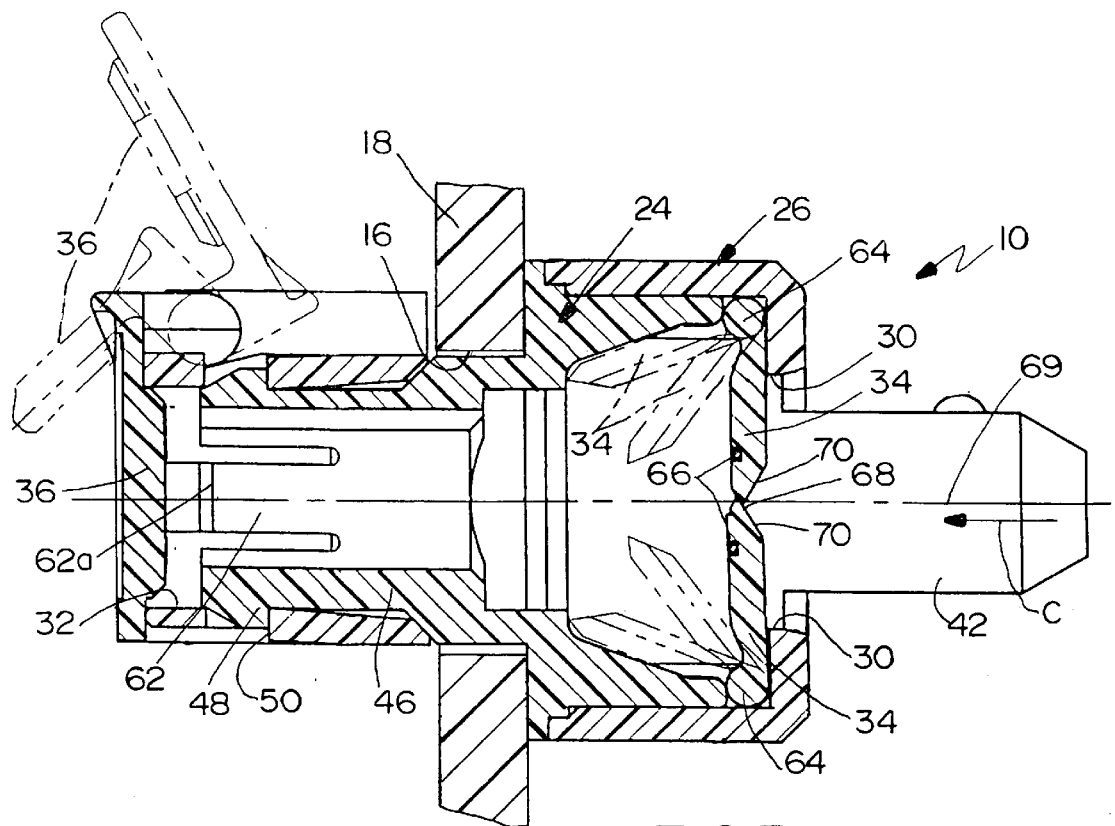
FIG. 3 is a vertical section taken generally along line 3—3 of FIG. 1.

Referring to the drawings in greater detail, the invention is embodied in a fiber optic connector/adapter assembly which includes three main components, namely: an adapter assembly, generally designated 10 and shown in FIGS. 1–6; a board connector, generally designated 12 and shown in FIGS. 7–10; and a cable connector, generally designated 14 and shown in FIGS. 11–20. Adapter assembly 10 is designed for mounting in an opening 16 in a panel, backplane or circuit board 18 as seen in FIG. 3. Cable connector 14 is adapted for terminating a fiber optic cable 20. While board connector 12 is mounted on a circuit board 22 (FIG. 9), the board connector also could be provided for terminating a fiber optic cable. However, for clarity purposes herein, connector 12 will be referred to as the "board" connector and connector 14 will be referred to as the "cable" connector.

Referring first to FIGS. 1–6, adapter assembly 10 includes a housing fabricated of three components as best seen in FIG. 2, namely: a center or main body, generally designated 24; a rear end receptacle body, generally designated 26; and a front end receptacle body, generally designated 28. Rear receptacle body 26 defines a first receptacle end 30 (FIG. 3) for receiving board connector 12. Front receptacle body 28 defines a second receptacle end 32 (FIG. 4) for receiving cable connector 14. A pair of generally planar, rectangular shutter doors 34 close and open first receptacle end 30 and a single generally planar rectangular shutter door 36 closes and opens second receptacle end 32.

Rear end receptacle body 26 of adapter assembly 10 is generally box-shaped as seen in FIG. 2 and forms sort of an end cap for telescoping over the rear end of main body 24 as seen best in FIG. 3. A pair of ramped latch bosses 38 on both the top and bottom of main body 24 snap into pairs of latch apertures 40 at the top and bottom of rear receptacle body 26. A pair of outwardly flared guide arms 42 project rearwardly of rear receptacle body 26 for guiding board connector 12 into first receptacle end 30 of the adapter assembly. As seen best in FIG. 2, a guide groove 44 is formed on the inside of rear receptacle body 26 near each corner thereof, with the groove leading to a hole 44*a* in the respective side wall of the rear receptacle body.

Figure 4:
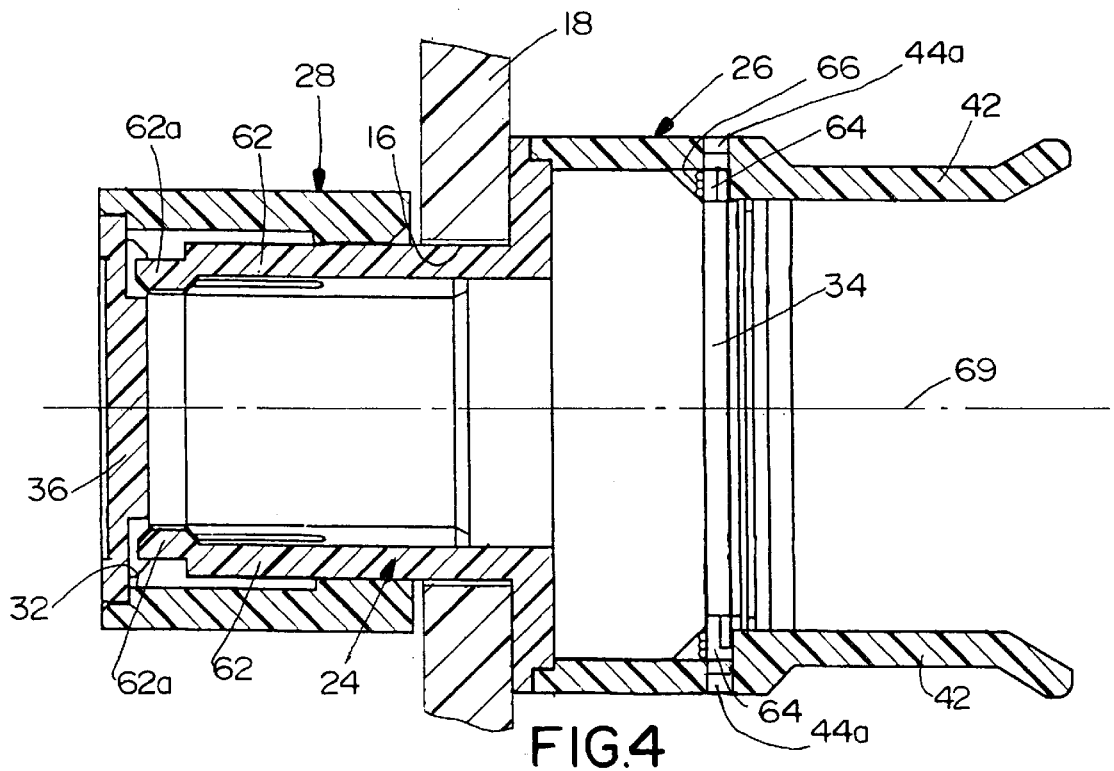
FIG. 4 is a horizontal section taken generally along line 4—4 of FIG. 1.
Figure 5:
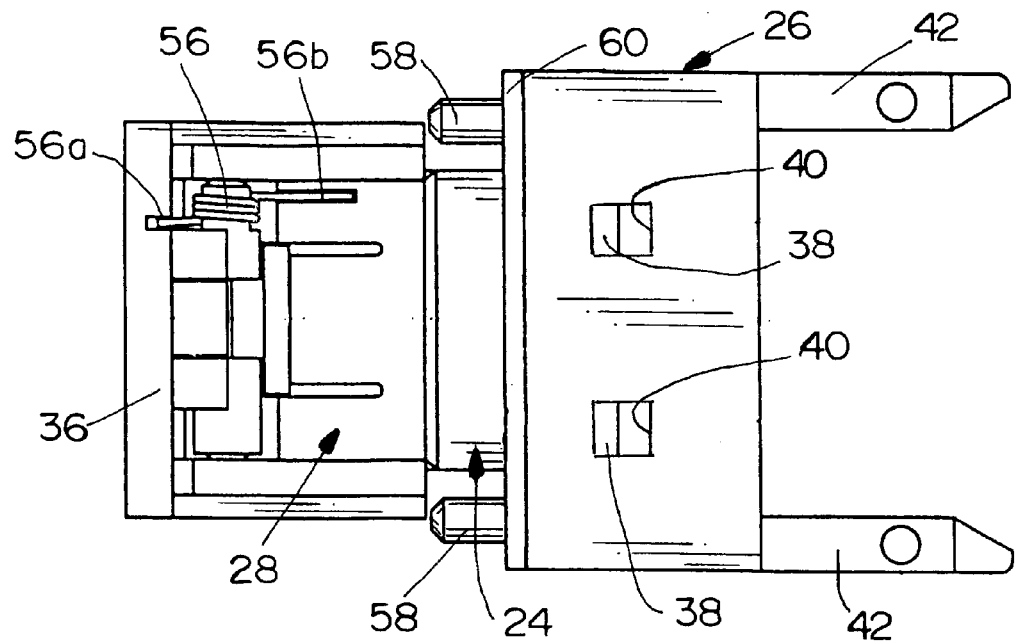
FIG. 5 is a top plan view of the adapter assembly.
Figure 6:
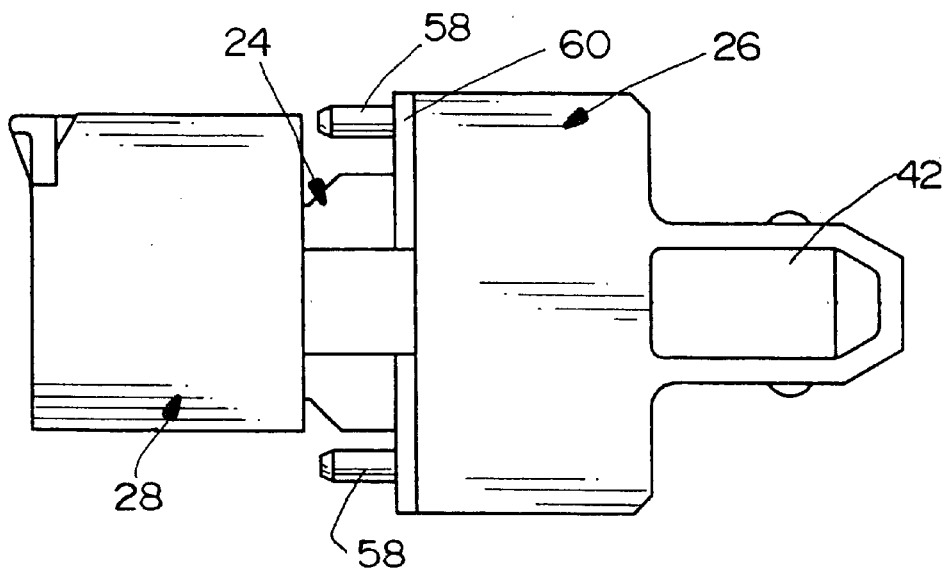
FIG. 6 is a side elevational view of the adapter assembly.

Front end receptacle body 28 of adapter assembly 10 is formed as a generally rectangular sleeve which slides over a generally rectangular projecting portion 46 of main body 24 and sandwiches panel 18 between the main body and the front end receptacle body as seen in FIGS. 3 and 4. A ramp latch boss 48 on the top and bottom of projection 46 snap behind ledges 50 at the front end of front receptacle body 28 to hold the receptacle body onto the main body as seen best in FIG. 3. Single shutter door 36 is pivotally mounted to front end receptacle body 28 by means of a pair of pivot trunions 52 (FIG. 2) which snap into holes 54 in the receptacle body. A torsion spring 56 (FIG. 5) has opposite ends 56*a* and 56*b* anchored to the shutter door and the receptacle body, respectively, for biasing the shutter door to its closed position shown in full lines in FIGS. 3 and 4. The shutter door can be manually opened as shown in phantom in FIG. 3 against the biasing of torsion spring 56.

Main body 24 of adapter assembly 10 includes a plurality of mounting posts 58 projecting forwardly of a flange 60 outside projecting portion 46, for insertion into appropriate mounting holes (not shown) in panel 18 (FIG. 3) to mount the main body within opening 16 in the panel. A pair of cantilevered latch arms 62 are provided for latchingly engaging cable connector 14.

Each of the pair of shutter doors 34 which close and open rear receptacle end 30 of the adapter assembly include a pair of pivot trunions 64 projecting outwardly from opposite sides thereof as best seen in FIG. 2. In assembly, the pair of shutter doors are mounted within rear receptacle body 26 by sliding pivot trunions 64 into guide grooves 44 until the pivot trunions snap into holes 44*a* in the side walls of the rear receptacle body. This allows for very easy assembly of the shutter doors within the adapter assembly. In other words, rear receptacle body holds the shutter doors as a subassembly which can be assembled as a unit to main body 24. A U-shaped torsion spring 66 spans the back side of each shutter door 34, with ends of the torsion spring anchored to rear receptacle body 26 to bias the shutter doors to their closed positions as shown in FIG. 3. The shutter doors pivot about pivot trunions 64 to open positions as shown in FIG. 3, in response to insertion of board connector 12 into rear receptacle end 30 of the adapter assembly.

The invention contemplates that shutter doors 34 overlap each other along their inner edges, as at 68 in FIG. 3, when the shutter doors are in their closed position. This positively ensures against light leakage along an optic axis 69 extending centrally through the adapter assembly. Dust also does not migrate to the interior of the adapter assembly. FIG. 3 shows the top shutter door overlapping the outside of the bottom shutter door. However, depending upon the sequence of closure, the bottom shutter door just as well could overlap the outside of the upper shutter door. Finally, the shutter doors are relieved, as at 70, along their inner edges for purposes described hereinafter.

The use of a pair of opposing shutter doors 34, versus a single door, has a number of advantages. First, the two doors save considerable axial space which otherwise would be required to accommodate the full pivoting action of a single door which would be twice as each of the pair of doors. Second, it is easier to open the two smaller doors because smaller springs can be provided. The connector is biased by the doors to the center and, thereby, most forces are applied near the edges of the doors, whereas with a single door a large force is required on one side of the centerline than the other side. Third, the wiping surface of either of the pair of doors 34 is one-half the wiping surface of a single door. With the single door, dust collected on the outside of the door is carried all the way toward the interface area between the connectors. With the two doors, any dust which accumulates on the outer surfaces thereof will be deposited primarily on the sides of the board connector rather than being carried interiorly by the mating face of the board connector.

Each of the main body 24, the rear end receptacle body 26, the front end receptacle body 28, each of the shutter doors 34 and the single shutter door 36 is a one-piece structure unitarily molded of dielectric material such as plastic or the like.

Figure 9:
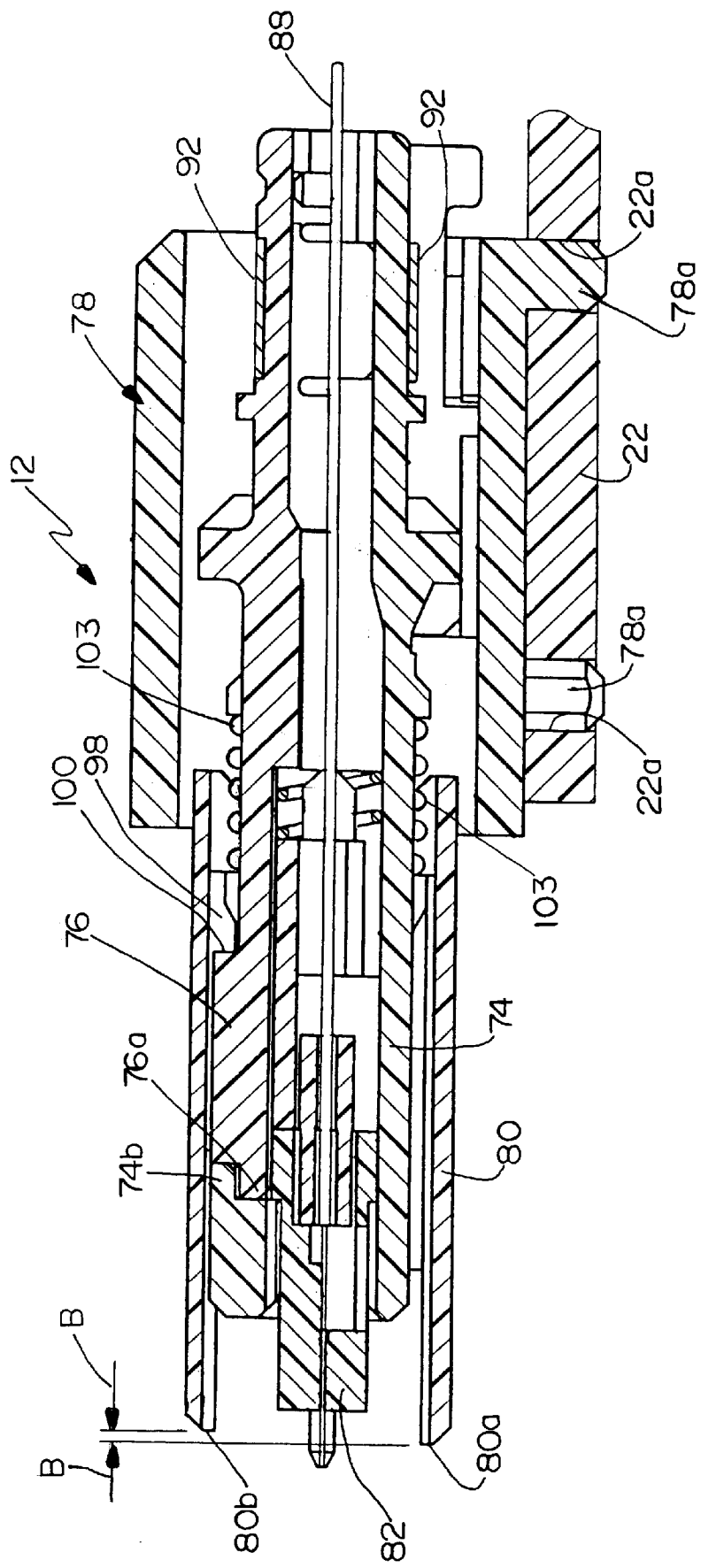
FIG. 9 is a vertical section taken generally along line 9—9 of FIG. 7.
Figure 10:
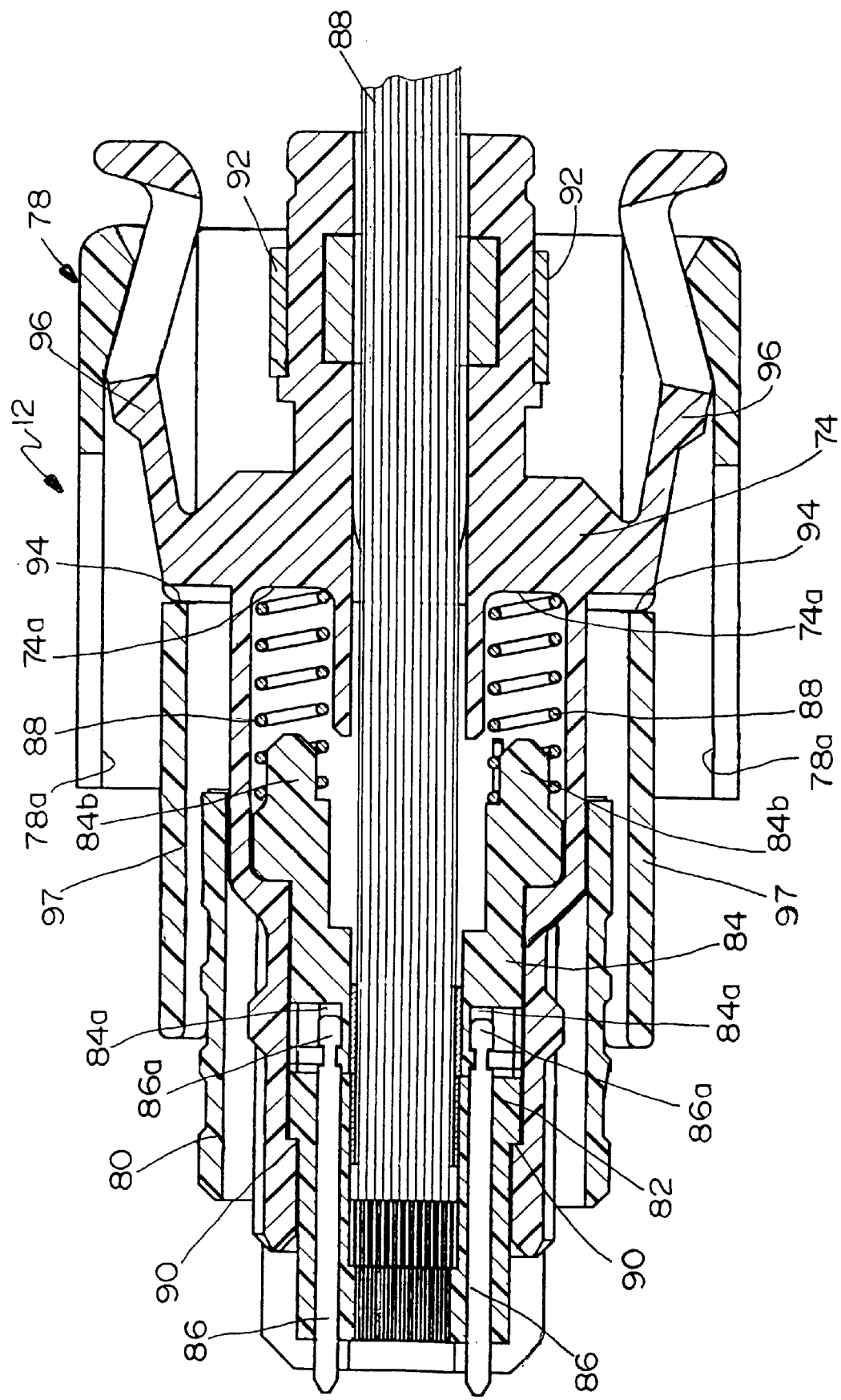
FIG. 10 is a vertical section taken generally along line 10—10 of FIG. 7.
Figure 11:
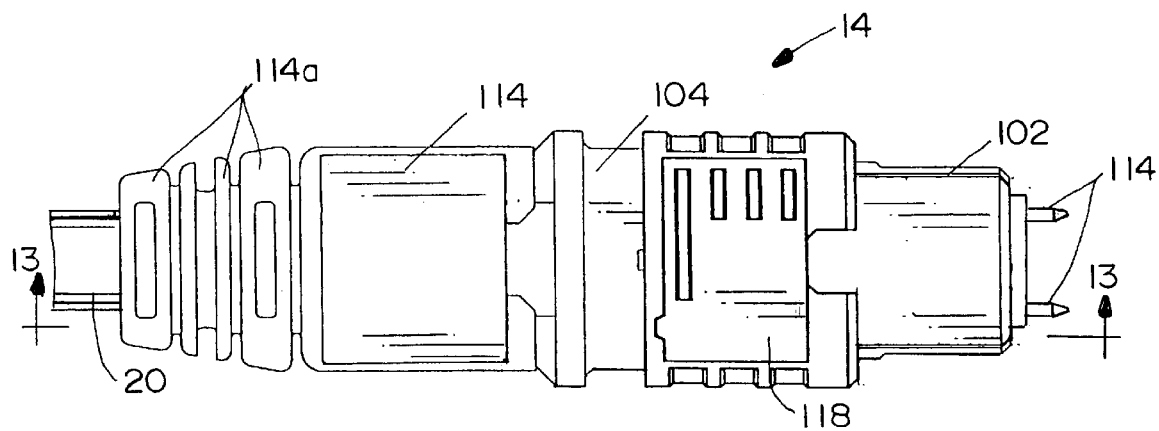
FIG. 11 is a top plan view of the cable connector.
Figure 12:
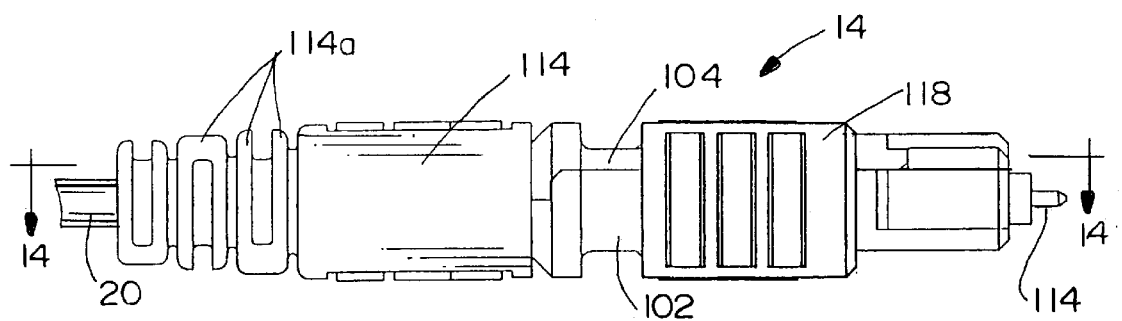
FIG. 12 is a side elevational view of the cable connector.
Figure 15:
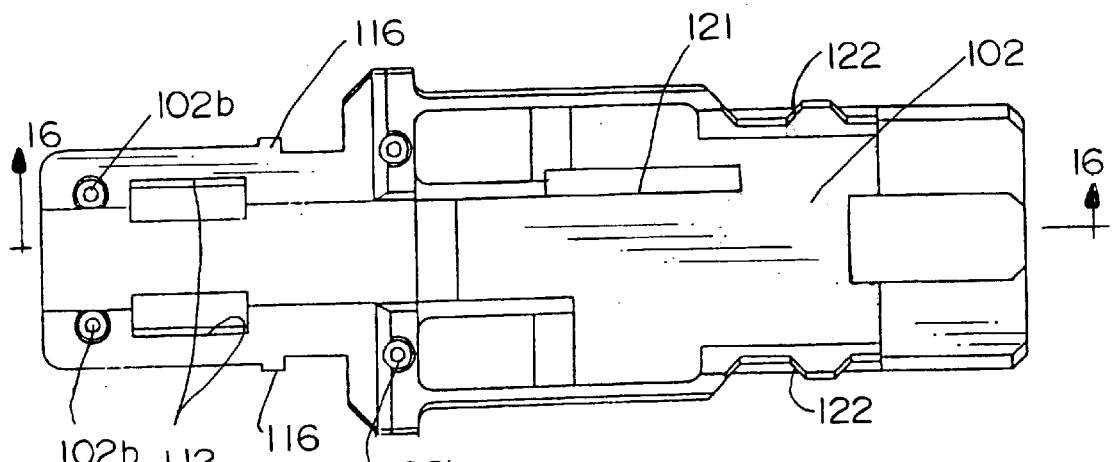
FIG. 15 is a top plan view of the bottom housing part of the cable connector.
Figure 16:
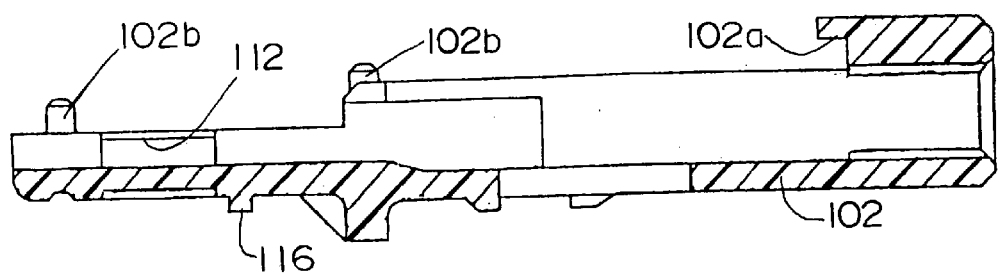
FIG. 16 is a vertical section taken generally along line 16—16 of FIG. 15.

FIGS. 7, 9 and 10 show board connector 12 in assembled condition, and FIG. 8 shows various components of the board connector. More particularly, FIG. 8 shows the board connector to include an inner, two-part housing, generally designated 72, which includes a base housing part 74 and a cover housing part 76; an outer board frame, generally designated 78; as well as a front shroud 80, a ferrule 82, a pin holder 84 and a pair of alignment pins 86. In assembly, a multi-fiber optic cable 87 (FIGS. 9 and 10) is terminated in ferrule 82; alignment pins 86 are anchored in pin holder 84, with the alignment pins projecting through the ferrule as seen best in FIG. 10, and this subassembly of the cable, ferrule, pins and pin holder are mounted within housing base 74 in the position shown in FIG. 10. Head portions 86*a* of the pins are anchored within passages 84*a* of pin holder 84. A pair of coil springs 88 surround posts 84*b* of pin holder 84 and abut against interior walls 74*a* of housing base 74 to bias the pin holder, ferrule and cable forwardly within the board connector. Abutment shoulders are provided, as at 90 in FIG. 10, between ferrule 82 and housing base 74 to define the forward limit position of this subassembly. A front lip 76*a* of housing cover 76 is positioned beneath a ledge 74*b* of housing base 74 as best seen in FIG. 9, to provide a fulcrum for pivoting the housing cover down onto the housing base. A crimp ring 92, such as of metal material, then is crimped onto the rear ends of the housing parts to hold the housing parts, ferrule, pin holder, alignment pins and fiber optic cable in assembled condition.

Outer board frame 78 of board connector 12 is assembled about inner housing 72 in the direction of arrow "A" (FIG. 8). In assembly, the outer frame will abut the inner housing, as at 94 in FIG. 10, and a pair of latch arms 96 are cantilevered outwardly of housing base 74 for holding the outer board frame to the inner housing as seen in FIG. 10. Outer board frame 78 includes a plurality of depending board-mounting posts 78a as seen in FIG. 9, for insertion into mounting holes 22a in board 22 to mount the board connector to the board. The outer board frame has a pair of side arms 97, and guide arms 42 of the rear receptacle body 26 of adapter assembly 10 mate on the outside of arms 97 and move into slots 78a on the sides of the outer board frame.

Front shroud 80 of board connector 12 is mounted onto the front end of inner housing 72 by means of a latch boss 98 (FIG. 9) on the interior of the front shroud and an abutment shoulder 100 on the top of housing cover 76. A pair of coil springs are sandwiched between the housing base and cover and the shroud to bias the shroud forwardly. The coil springs are located in slots in the housing base and the housing cover. One of the slots 101 is visible in housing cover 76 in FIG. 8. A similar slot is in the housing base. The tops of the coil springs are visible in FIG. 9, as at 103.

A novel feature of the invention is best shown in FIG. 9 wherein it can be seen that the front end of shroud 80 is offset as indicated by arrows "B". In other words, a bottom edge 80a projects further outwardly than a top edge 80b of the shroud a distance indicated by arrows "B". Therefore, comparing FIG. 9 with FIG. 3, when board connector 12 is inserted into rear receptacle end 30 of adapter assembly 10 in the direction of arrow "C" (FIG. 3), bottom edge 80a of shroud 80 will engage the bottom shutter door 34 before top edge 80b of the shroud engages the top shutter door. Similarly, when the board connector is pulled out of the adapter assembly, the top shutter door will pivot to its closed position prior to the pivoting action of the bottom shutter door, because of the offset front mating end of the board connector. Although sequential opening of the shutter doors is not all that critical, it is important that one of the shutter doors closes before the other shutter door, so that the edges of the shutter doors do not jam or abut and prevent complete closure. By offsetting the front edges 80a and 80b of shroud 80, sequential closing of the doors is assured to ensure that the doors overlap completely across optic axis 69.

When board connector 12 is inserted into rear receptacle end 30 of adapter assembly 10, and shroud 80 engages shutter doors 34, provision must be made to prevent the tips of alignment pins 86 from engaging the doors. As stated above, the inner edges of the doors are relieved at 70. This provides a recessed area into which the tips of the alignments pin project without engaging the doors. The recessed area also protects the polished ends of the fibers at the front face of ferrule 82.

Figure 17:
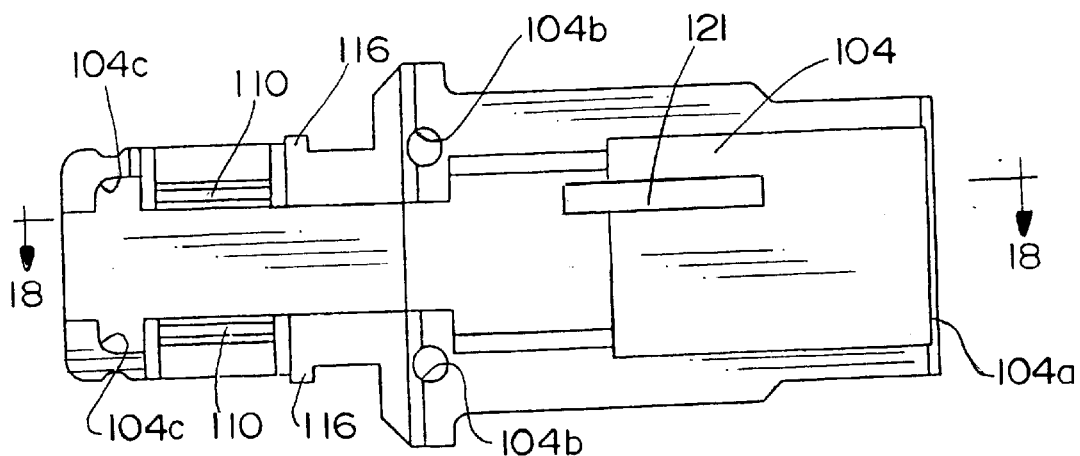
FIG. 17 is a bottom plan view of the upper housing part of the cable connector.
Figure 18:
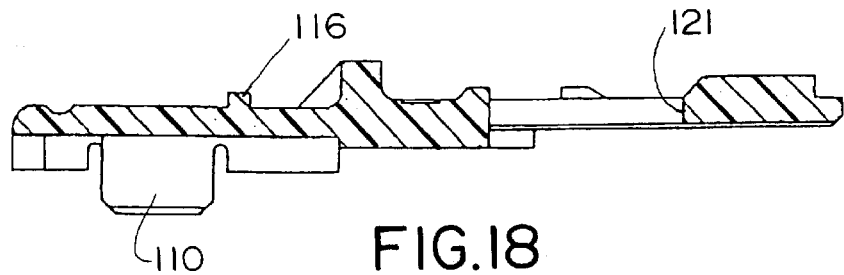
FIG. 18 is a section taken generally along line 18—18 of FIG. 17.
Figure 19:
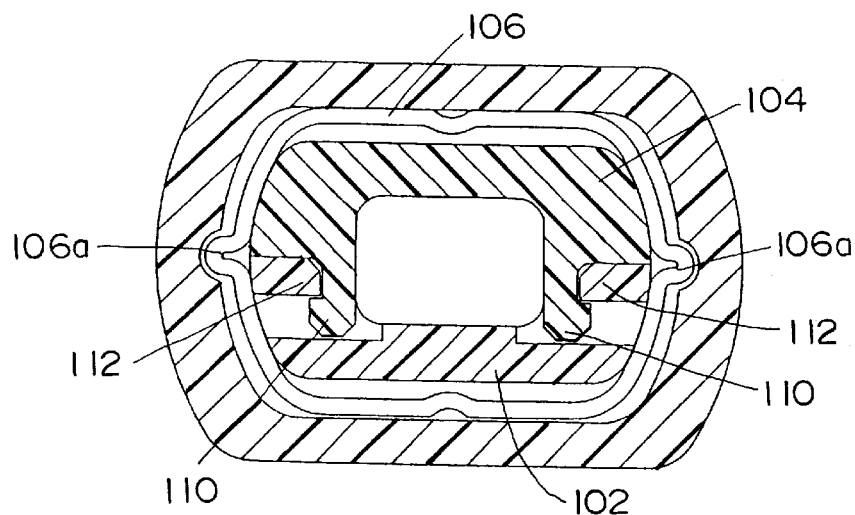
FIG. 19 is a vertical section taken generally along line 19—19 of FIG. 13.

Cable connector 14 is shown in FIGS. 11–20 and is constructed similar to board connector 12, to the extent that cable connector 14 includes an inner two-part housing formed by a housing base 102 (FIGS. 15 and 16) and a housing cover 104 (FIGS. 17 and 18). Like the board connector, a front lip 104a of the cover is positioned beneath a ledge 102a of the base as best seen in FIG. 13, to form a fulcrum about which the cover is pivotally mounted down onto the base. The two parts of the housing extend along a substantial length of the housing through a rear end thereof whereat a crimp ring 106, such as of metal material, can be crimped to hold the housing parts together. The crimp ring is shown crimped, as at 106a, in FIG. 19.

Again, like board connector 12, cable connector 14 includes a ferrule 108 for terminating the fibers of a multi-fiber optic cable 110, a pin holder 112 anchoring the rear ends 114a of a pair of alignment pins 114 which extend through the ferrule, and a pair of coil springs 116 for biasing the pin holder, alignment pins, ferrule and cable forwardly of the assembled housing parts.

Figure 20:
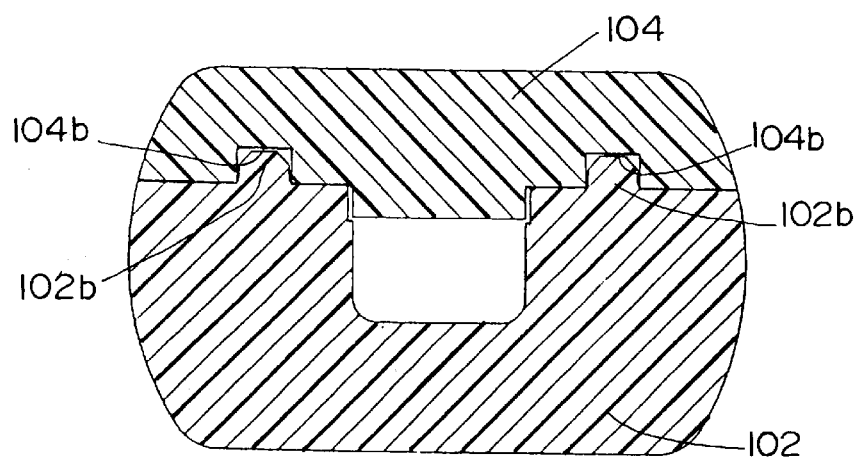
FIG. 20 is a vertical section taken generally along line 20—20 of FIG. 14.

When assembling housing cover 102 to housing base 104 a plurality of guide posts 102b (FIG. 15) are positioned within a plurality of guide holes 104b and guide recesses 104c (FIG. 17) in housing cover 104. FIG. 20 shows guide posts 102b within guide holes 104b.

In order to secure housing base 102 and housing cover 104 in assembled condition, the housing cover includes a pair of transversely spaced, hooked latch arms 110 which snap behind ledges 112 on housing base 102. This complementary interengaging latch means is shown best in FIG. 19. As seen in FIG. 14, when the housing base and cover are fully assembled, the latch arms will straddle opposite sides 113 of the fiber array 20a of cable 20. The latch arms, therefore, are disposed inside the outer profile of the two-part housing so that the housing does not have to be enlarged to provide a latch means. Each of the two housing parts, namely housing base 102 and housing cover 104 is a one-piece structure unitarily molded of plastic material or the like.

A rear boot 114 of elastomeric material or the like is disposed about the rear end of cable connector 14. The boot is a one-piece structure fabricated of somewhat flexible material to provide a strain relief means at the rear of the connector and about cable 20. The rear of the boot includes finger-gripping exterior ribs 114a to facilitate gripping the cable connector and inserting the connector into adapter assembly 10. The boot is generally hollow and includes interior latches 114b (FIG. 14) for snapping behind latch flanges 116 of the two housing parts.

A pull latch 118 surrounds the inner two-part housing of cable connector 14 for latching the cable connector to adapter assembly 10. A pair of coil springs 120 (FIG. 13) are captured in slots 121 (FIGS. 15 and 17) and bias the pull latch forwardly in the direction of arrows "D". When the cable connector is inserted into the adapter assembly, the front ends of cantilevered latch arms 62 (FIG. 2) will engage the front of pull latch 118 and bias the pull latch rearwardly against coil springs 120 opposite the direction of arrows "D" until the cantilevered latch arms snap behind latch shoulders 122 (FIGS. 14 and 15) of housing body 102. Latch arms 62 have inwardly offset latch hooks 62a (FIG. 2) which snap behind latch shoulders 122, whereupon pull latch 118 is biased back forwardly by coil springs 120. The front end of the pull latch will then move over the top of hooked ends 62a of the latch arms to prevent the latch arms from moving out of their locked position behind shoulders 122. When it is desired to disconnect cable connector 14 from adapter assembly 10, pull latch 118 is pulled rearwardly opposite the direction of arrows "D" whereupon latch arms 62 are free to move transversely outwardly away from latch shoulders 122 and allow the cable connector to be pulled out of the adapter assembly.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A fiber optic connector assembly for terminating at least one optical fiber of a fiber optic cable, comprising:
   a two-part elongated housing for receiving the fiber optic cable and defining a forward mating end and a rear end, the two parts of the housing extending along a substantial length of the housing through the rear end thereof;

a ferrule within the forward end of the two-part housing for terminating the optical fiber;

the two parts of the housing being juxtaposed and adapted for receiving a crimp ring thereabout at the rear end of the housing; and a pair of transversely spaced, complementarily engageable latch means operatively associated between the two housing parts, the pair of latch means being disposed inside the outer profile of the housing and straddling opposite sides of the cable therewithin.

2. The fiber optic connector assembly of claim 1 wherein said latch means comprise a pair of latch arms disposed immediately on opposite sides of the cable when the cable is assembled in the housing.

3. The fiber optic connector assembly of claim 2 wherein said latch arms project from one housing part and include latch hooks for snap-latch engagement with latch bosses on the other housing part.

4. The fiber optic connector assembly of claim 1 wherein at least one of the housing parts includes at least one alignment post for insertion into an alignment hole in the other housing part in a direction generally transversely of the cable.

5. A fiber optic connector assembly for terminating at least one optical fiber of a fiber optic cable, comprising:

a two-part elongated housing for receiving the fiber optic cable and defining a forward mating end and a rear end, the two parts of the housing extending along a substantial length of the housing through the rear end thereof, and the two parts of the housing each being a one-piece structure unitarily molded of dielectric material;

a ferrule within the forward end of the two-part housing for terminating the optical fiber;

a pair of transversely spaced, complementarily engageable latch means operatively associated between the two housing parts, the pair of latch means being disposed inside the outer profile of the housing and straddling opposite sides of the cable therewithin; and a metal crimp ring clamped about juxtaposed rear ends of the two housing parts.

6. The fiber optic connector assembly of claim 5 wherein said latch means comprise a pair of latch arms disposed immediately on opposite sides of the cable when the cable is assembled in the housing.

7. The fiber optic connector assembly of claim 6 wherein said latch arms project from one housing part and include latch hooks for snap-latch engagement with latch bosses on the other housing part.

8. The fiber optic connector assembly of claim 5 wherein at least one of the housing parts includes at least one alignment post for insertion into an alignment hole in the other housing part in a direction generally transversely of the cable.

9. A fiber optic connector assembly for terminating at least one optical fiber of a fiber optic cable, comprising:

a housing for receiving the fiber optic cable and defining a forward mating end for mating with a complementary connecting device;

a ferrule within the forward end of the housing for terminating the optical fiber;

a pin holder within the housing behind the ferrule;

a pair of alignment pins held by the pin holder on opposite sides of the cable and extending through the ferrule for aligning the connector with the complementary connecting device; and a pair of springs on opposite sides of the cable and sandwiched between the housing and the pin holder for biasing the pin holder and, thereby, the ferrule forwardly relative to the housing.

* * * * *